(12) United States Patent
Pringle, Jr. et al.

(10) Patent No.: US 10,235,322 B1
(45) Date of Patent: Mar. 19, 2019

(54) HOT-SWAPPABLE ADAPTER SYSTEM FOR NON-HOT-SWAPPABLE EXPANSION CARDS

(71) Applicant: EMC CORPORATION, Hopkinton, MA (US)

(72) Inventors: James L. Pringle, Jr., Pelham, NH (US); Daniel Dufresne, Salem, NH (US); Stephen E. Strickland, Foxboro, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 324 days.

(21) Appl. No.: 15/189,702

(22) Filed: Jun. 22, 2016

(51) Int. Cl.
*H05K 7/10* (2006.01)
*G06F 13/40* (2006.01)
*G06F 9/4401* (2018.01)

(52) U.S. Cl.
CPC .......... *G06F 13/4068* (2013.01); *G06F 9/442* (2013.01); *G06F 9/4403* (2013.01)

(58) Field of Classification Search
CPC ..... G06F 13/4068; G06F 9/4403; G06F 9/442
See application file for complete search history.

(56) References Cited

U.S. PATENT DOCUMENTS

| | | | |
|---|---|---|---|
| 5,222,897 A | 6/1993 | Collins et al. | |
| 6,050,779 A * | 4/2000 | Nagao | F04B 17/006 417/28 |
| 6,795,314 B1 * | 9/2004 | Arbogast | H05K 7/20172 165/104.33 |
| 6,885,002 B1 * | 4/2005 | Finch | H04N 5/33 250/330 |
| 7,924,558 B2 | 4/2011 | Crippen et al. | |
| 8,174,834 B2 | 5/2012 | Kim et al. | |
| 8,174,835 B2 * | 5/2012 | Kim | G06F 1/185 361/679.31 |
| 2002/0196611 A1 * | 12/2002 | Ho | G06F 13/4081 361/752 |
| 2005/0009382 A1 * | 1/2005 | Burmeister | H01R 4/5058 439/67 |
| 2007/0255880 A1 * | 11/2007 | Oster | G06F 13/409 710/302 |
| 2007/0268726 A1 * | 11/2007 | Kojori | H02J 1/10 363/65 |
| 2017/0027078 A1 * | 1/2017 | Yang | G06F 1/18 |

OTHER PUBLICATIONS

Non-Final Office Action issued in U.S. Appl. No. 15/189,632 dated Mar. 2, 2017.

(Continued)

*Primary Examiner* — Jing-Yih Shyu
(74) *Attorney, Agent, or Firm* — Brian J. Colandreo; Mark H. Whittenberger; Holland & Knight LLP

(57) ABSTRACT

An adapter assembly includes an adapter board. A first connector assembly is coupled to the adapter board and is configured to releasably electrically couple the adapter board to a high-availability IT component. A second connector assembly is coupled to the adapter board and is configured to releasably couple the adapter board to a non-hot-swappable industry standard expansion card. The adapter board includes hot swap logic configured to enable the non-hot-swappable industry standard expansion card to function as a hot-swappable industry standard expansion card.

6 Claims, 4 Drawing Sheets

(56) References Cited

OTHER PUBLICATIONS

Final Office Action issued in U.S. Appl. No. 15/189,632, dated Mar. 12, 2018.
Final Office Action issued in U.S. Appl. No. 15/189,632 dated Jun. 12, 2017.
TechTarget SearchStorage. See Sliwa, C. (Apr. 2015). Host bus adapter (HBA). Retrieved Aug. 7, 2017, from http://searchstorage.techtarget.com/definition/host-bus-adapter.
Non-Final Office Action issued in U.S. Appl. No. 15/189,632 dated Oct. 24, 2017.

* cited by examiner

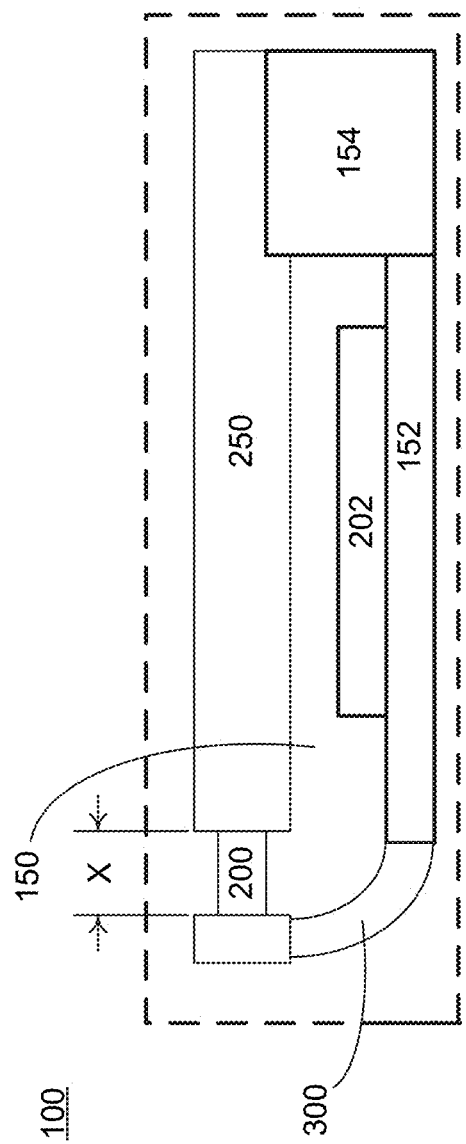

HOT-SWAPPABLE ADAPTER SYSTEM FOR NON-HOT-SWAPPABLE EXPANSION CARDS

TECHNICAL FIELD

This disclosure relates to Information Technology (IT) components and, more particularly, to adapter systems for use within IT components.

BACKGROUND

In today's IT infrastructure, high availability is of paramount importance. Specifically, critical (and sometimes non-critical) components within an IT infrastructure are often layered in redundancy. For example, primary servers may be supported by backup servers; primary switches may be supported by backup switches; primary power supplies may be supported by backup power supplies; and primary storage systems may be supported by backup storage systems.

Oftentimes, various subcomponents within these IT components need to be installed/serviced/replaced. Naturally, the greater the flexibility concerning these subcomponents, the more cost efficient and effective the servicing of these components can be.

SUMMARY OF DISCLOSURE

In one implementation, an adapter assembly includes an adapter board. A first connector assembly is coupled to the adapter board and is configured to releasably electrically couple the adapter board to a high-availability IT component. A second connector assembly is coupled to the adapter board and is configured to releasably couple the adapter board to a non-hot-swappable industry standard expansion card. The adapter board includes hot swap logic configured to enable the non-hot-swappable industry standard expansion card to function as a hot-swappable industry standard expansion card.

One or more of the following features may be included. The adapter assembly may include a right-angle coupler configured to electrically couple the second connector assembly to the adapter board. The right-angle coupler may include a flexible conductor assembly configured to electrically couple the second connector assembly to the adapter board. The high-availability IT component may be a portion of a data array. The industry standard expansion card may be a host bus adapter card. The adapter assembly may be configured to be positioned within an enclosure of a hot swappable IT carrier assembly. The hot swap logic may include hold-in-reset technology that holds the non-hot-swappable industry standard expansion card in a reset state until the non-hot-swappable industry standard expansion card is functioning properly and then releases the non-hot-swappable industry standard expansion card from the reset state so that the non-hot-swappable industry standard expansion card may enter a standard operation state. The hot swap logic may include start-stop technology that allows the high-availability IT component to power up and/or power down the non-hot-swappable industry standard expansion card. The hot swap logic may include softstart technology that limits the amount of current that the non-hot-swappable industry standard expansion card can draw upon being powered up so that the current draw of the non-hot-swappable industry standard expansion card is not enough to interfere with the operation of other components of the high-availability IT component.

In another implementation, an adapter assembly includes an adapter board. A first connector assembly is coupled to the adapter board and is configured to releasably electrically couple the adapter board to a high-availability IT component. A second connector assembly is coupled to the adapter board and is configured to releasably couple the adapter board to a non-hot-swappable industry standard expansion card. The adapter board includes hot swap logic configured to enable the non-hot-swappable industry standard expansion card to function as a hot-swappable industry standard expansion card. The hot swap logic includes one or more of: hold-in-reset technology that holds the non-hot-swappable industry standard expansion card in a reset state until the non-hot-swappable industry standard expansion card is functioning properly and then releases the non-hot-swappable industry standard expansion card from the reset state so that the non-hot-swappable industry standard expansion card may enter a standard operation state; start-stop technology that allows the high-availability IT component to power up and/or power down the non-hot-swappable industry standard expansion card, and softstart technology that limits the amount of current that the non-hot-swappable industry standard expansion card can draw upon being powered up so that the current draw of the non-hot-swappable industry standard expansion card is not enough to interfere with the operation of other components of the high-availability IT component.

One or more of the following features may be included. A right-angle coupler may be configured to electrically couple the second connector assembly to the adapter board. The right-angle coupler may include a flexible conductor assembly configured to electrically couple the second connector assembly to the adapter board. The high-availability IT component may be a portion of a data array. The industry standard expansion card may be a host bus adapter card. The adapter assembly may be configured to be positioned within an enclosure of a hot swappable IT carrier assembly.

In another implementation, a hot swappable IT carrier assembly includes an enclosure and an adapter assembly configured to be positioned within an enclosure. The adapter assembly includes an adapter board. A first connector assembly is coupled to the adapter board and is configured to releasably electrically couple the adapter board to a high-availability IT component. A second connector assembly is coupled to the adapter board and is configured to releasably couple the adapter board to a non-hot-swappable industry standard expansion card. The adapter board includes hot swap logic configured to enable the non-hot-swappable industry standard expansion card to function as a hot-swappable industry standard expansion card.

One or more of the following features may be included. The industry standard expansion card may be a host bus adapter card. The hot swap logic may include hold-in-reset technology that holds the non-hot-swappable industry standard expansion card in a reset state until the non-hot-swappable industry standard expansion card is functioning properly and then releases the non-hot-swappable industry standard expansion card from the reset state so that the non-hot-swappable industry standard expansion card may enter a standard operation state. The hot swap logic may include start-stop technology that allows the high-availability IT component to power up and/or power down the non-hot-swappable industry standard expansion card. The hot swap logic may include softstart technology that limits the amount of current that the non-hot-swappable industry standard expansion card can draw upon being powered up so that the current draw of the non-hot-swappable industry standard expansion card is not enough to interfere with the operation of other components of the high-availability IT component.

The details of one or more implementations are set forth in the accompanying drawings and the description below. Other features and advantages will become apparent from the description, the drawings, and the claims.

BRIEF DESCRIPTION OF THE DRAWINGS

FIG. 6 is a rear view of the IT carrier assembly of FIG. 3 with an expansion card installed.

Like reference symbols in the various drawings indicate like elements.

DETAILED DESCRIPTION OF THE PREFERRED EMBODIMENTS

Figure 1:
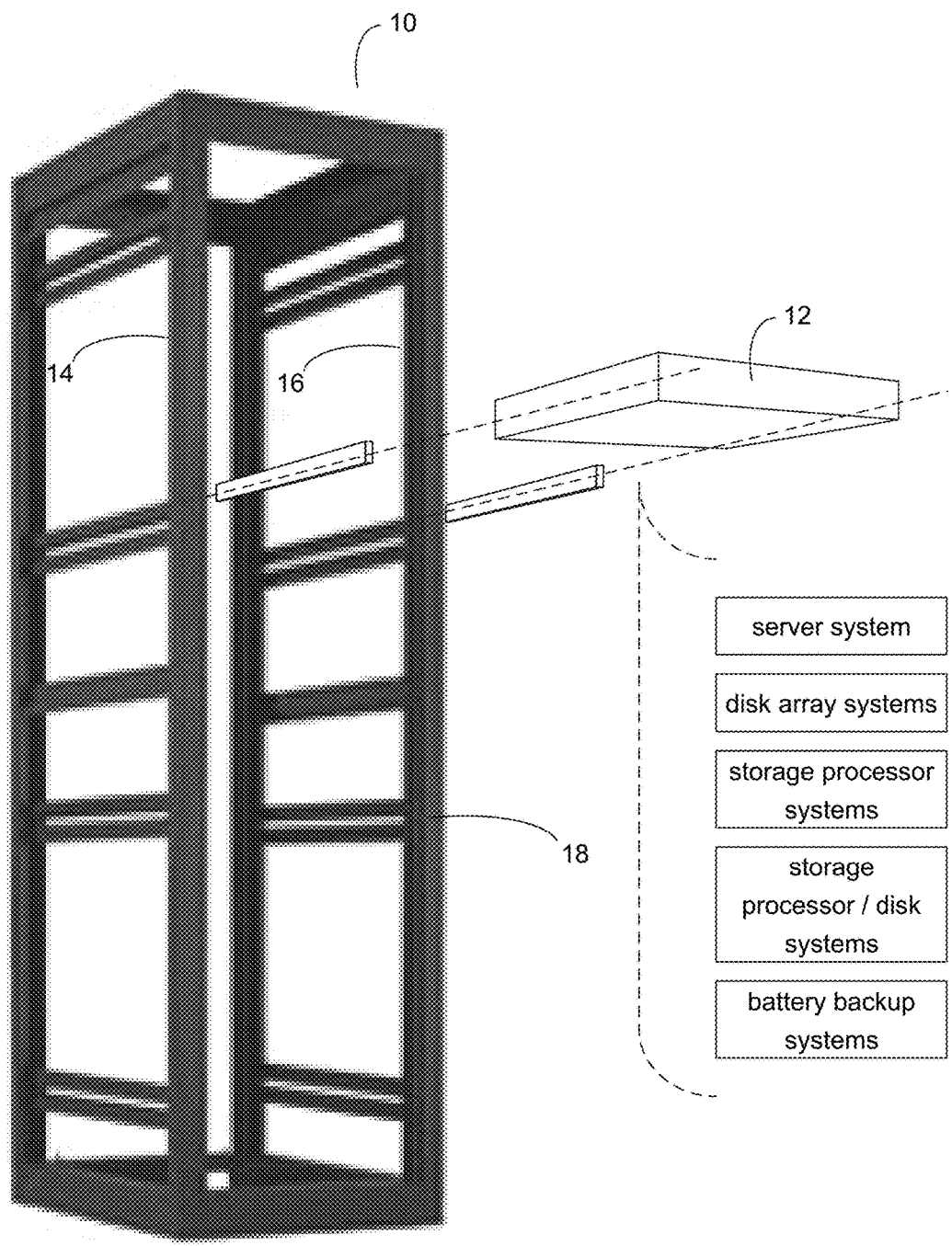
FIG. 1 is a perspective view of an IT rack and an IT component.

Referring to FIG. 1, IT racks (e.g., IT rack 10) may be utilized to store and organize IT components. For example, IT rack 10 may be placed within a computer room and various high-availability IT components (e.g., IT component 12) may be attached to rails (e.g., National Electrical Manufacturers Association (NEMA) rails 14, 16) included within IT rack 10, wherein these rails (e.g., NEMA rails 14, 16) may have a standard and defined spacing between them (e.g., 19"). Typically, IT components that are configured to fit within IT rack 10 may be described as rack-mountable IT components.

Examples of the various IT components (e.g., IT component 12) mountable within IT rack 10 may include but are not limited to: server systems, disk array systems, storage processor systems, storage processor/disk systems, and battery backup systems.

IT rack 10 may include frame 18 (which may include one or more vertical supports, horizontal supports, and cross braces) to which NEMA rails 14, 16 may be attached. NEMA rails 14, 16 may include a plurality of evenly spaced holes that may be configured for mounting the various IT components within IT rack 10. By standardizing the spacing between NEMA rails 14, 16, the various IT devices that fit within a first IT rack may also fit within a second IT rack.

These various IT components (e.g., IT component 12) may be available in standardized heights based upon the number of rack units (U's). Examples of such standardized heights may include but are not limited to 1U IT components, 2U IT components, 3U IT components, and 4U IT components, wherein a 1U IT component is half as high as a 2U IT component, which is half as high as a 4U IT component.

IT racks (e.g., IT rack 10) may be available in various heights, which are capable of accommodating a defined number of rack units (U's). However, while the number of rack units available within a particular IT rack may be rigidly defined by the height of the IT rack, the number of IT components mountable within that IT rack may vary depending upon the height in rack units (U's) of the particular IT components being mounted within that IT rack. Therefore, by reducing the number of rack units utilized by a particular IT component within an IT rack, additional IT components may be mounted within the IT rack.

Figure 2:
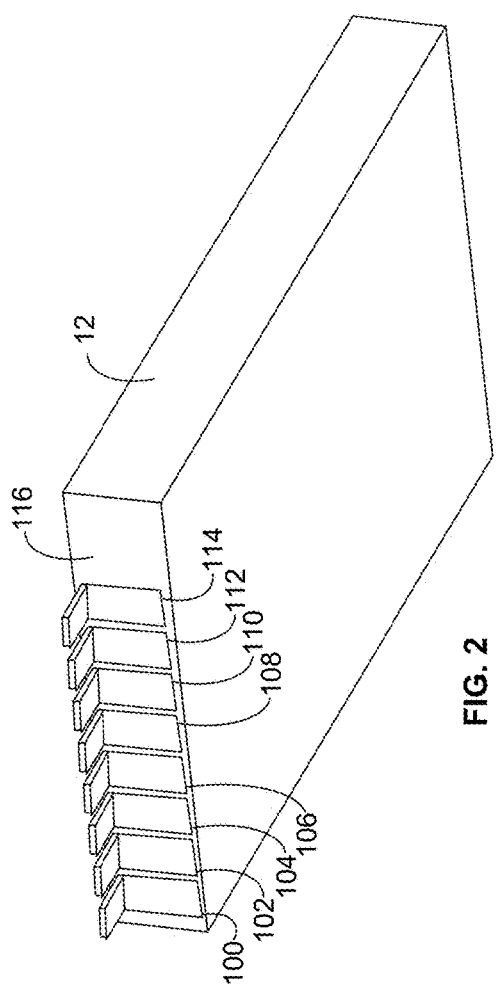
FIG. 2 is a perspective rear view of the IT component of FIG. 1.

Referring also to FIG. 2, there is shown a more detailed view of IT component 12. In this particular example, IT component 12 is shown to include a plurality of IT carrier assemblies (e.g., IT carrier assemblies 100, 102, 104, 106, 108, 110, 112, 114). While in this particular example, IT component 12 is shown to include eight IT carrier assemblies, this is for illustrative purposes only and is not intended to be a limitation of this disclosure, as the number of IT carrier assemblies included within IT component 12 may be increased or decreased depending upon need.

While, in this particular example, the plurality of IT carrier assemblies (e.g., IT carrier assemblies 100, 102, 104, 106, 108, 110, 112, 114) is shown to be accessible through a rear panel (e.g., rear panel 116) of IT component 12, this is for illustrative purposes only and is not intended to be a limitation of this disclosure, as e.g., IT carrier assemblies 100, 102, 104, 106, 108, 110, 112, 114 may be accessible through e.g., a front panel (not shown) of IT component 12.

IT carrier assemblies 100, 102, 104, 106, 108, 110, 112, 114 may be hot-swappable and, therefore, configured to be installed into and removed from IT component 12 during the operation of IT component 12. As is known in the art, a device is hot-swappable when the device may be non-disruptively installed into or removed from e.g., IT component 12 (e.g., a server system, a disk array system, a storage processor system, a storage processor/disk system, and a battery backup system) while other components within IT component 12 continue to function properly.

IT carrier assemblies 100, 102, 104, 106, 108, 110, 112, 114 may be configured to allow a user to selectively remove and add functionality and/or features to IT component 12. For example, one or more of IT carrier assemblies 100, 102, 104, 106, 108, 110, 112, 114 may be configured as network connectivity modules that allow IT component 12 to be interface with a computer network.

For the following example, IT carrier assembly 100 will be discussed. However, it is understood that the following discussion may apply to any of IT carrier assemblies 100, 102, 104, 106, 108, 110, 112, 114.

Figure 3:
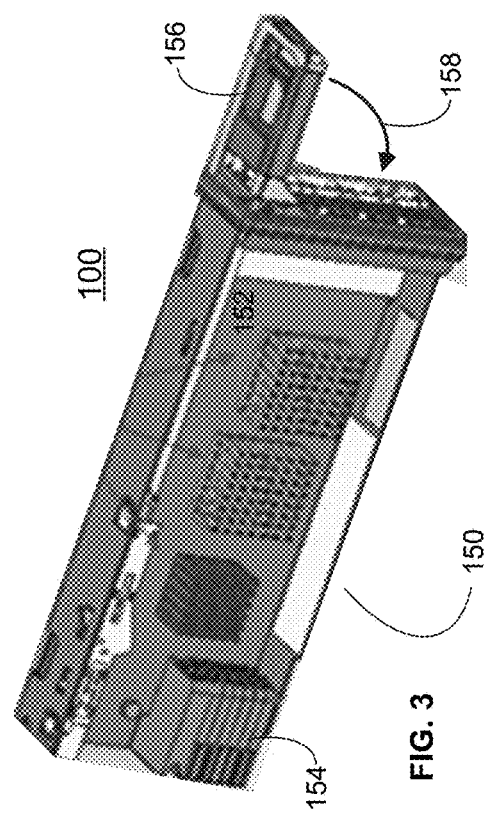
FIG. 3 is a perspective front view of an IT carrier assembly for use within the IT component of FIG. 1.

Referring also to FIG. 3, IT carrier assembly 100 may include adapter assembly 150. Adapter assembly 150 may include adapter board 152 and first connector assembly 154. IT carrier assembly 100 may also include latch assembly 156 that is configured to releasably-secure IT carrier assembly 100 within (in this example) IT component 12 (e.g., by moving latch assembly 156 in the direction of arrow 158).

First connector assembly 154 may be coupled to adapter board 152 and may be configured to releasably electrically couple adapter board 152 to IT component 12. As discussed above, examples of IT component 12 may include but are not limited to a portion of a data array, such as a server system, a disk array system, a storage processor system, a storage processor/disk system, and a battery backup systems.

Figure 4:
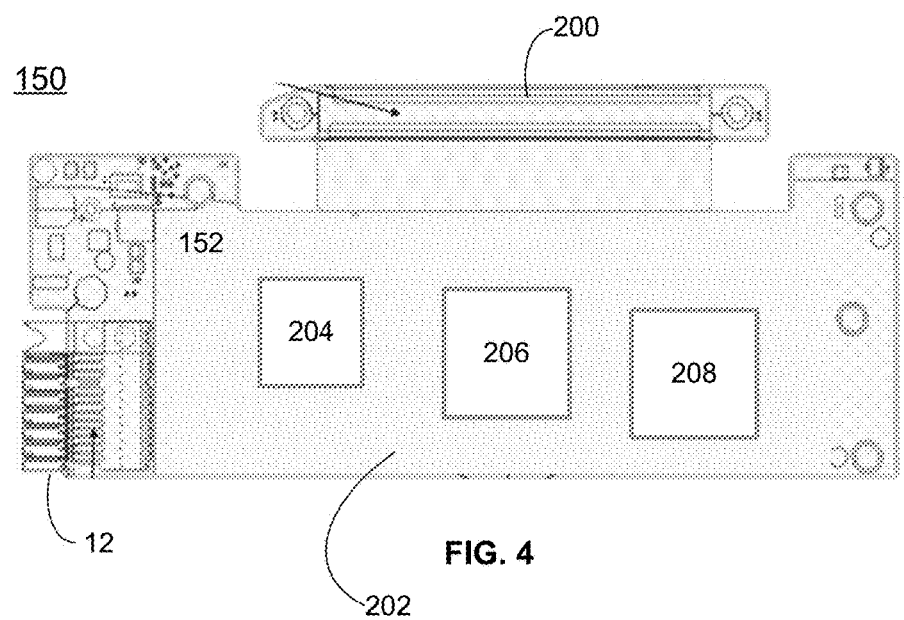
FIG. 4 is a top view of an adapter system for use within the IT carrier assembly of FIG. 3.
Figure 5:
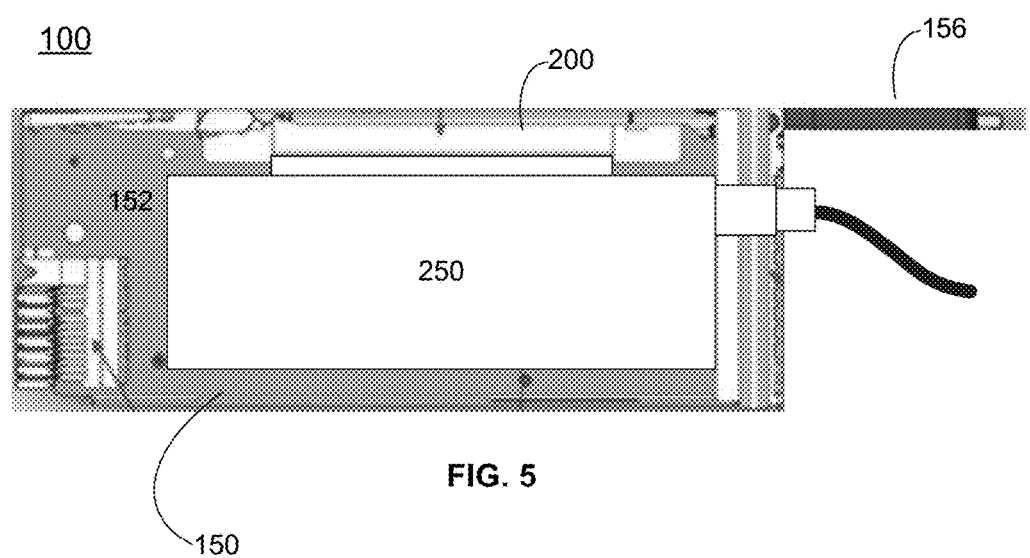
FIG. 5 is a top view of the IT carrier assembly of FIG. 3 with an expansion card installed.

Referring also to FIGS. 4-5, adapter assembly 150 within IT carrier assembly 100 may also include second connector assembly 200, which may be coupled to adapter board 152 and may be configured to releasably couple adapter board 152 to industry standard expansion card 250 (e.g., either a hot-swappable industry standard expansion card or a non-hot-swappable industry standard expansion card).

As discussed above and as shown in the corresponding figures, adapter assembly 150 may be configured to be positioned and contained within an enclosure of IT carrier assembly 100, wherein IT carrier assembly 100 may be configured to be removably insertable into IT component 12. An example of IT carrier assembly 100 may include but is not limited to a hot-swappable SLIC module (such as those offered by the EMC Corporation of Hopkinton, Mass.). An example of industry standard expansion card 250 may include but is not limited to a host bus adapter card, such as an Intel® Ethernet Server Adapter I210-T1. Accordingly and through the user of adapter assembly 150 positioned within IT carrier assembly 100, industry standard expansion card 250 may be utilized within IT Component 12, thus providing administrators of IT component 12 with greater flexibility concerning their choice of subcomponents.

Referring also to FIG. 6, there is shown a rear view of IT carrier assembly 100. Adapter assembly 150 may include right-angle coupler 300 that may be configured to electrically couple second connector assembly 200 to adapter board 152. An example of right-angle coupler 300 may include but is not limited to a flexible conductor assembly (e.g., a flexible printed circuit board) configured to electrically couple second connector assembly 200 to adapter board 152. Alternatively, second connector assembly 200 may be configured as a right angle connector assembly that is configured to directly engage adapter board 152. Further, second connector assembly 200 may be a low profile connector assembly that is configured to have a reduced x-axis dimension, thus maximizing available space for industry standard expansion card 250 in the X-axis.

As discussed above, industry standard expansion card 250 may be either a hot-swappable industry standard expansion card or non-hot-swappable industry standard expansion card. Accordingly, adapter board 152 may include hot swap logic 202 (e.g., hardware and/or firmware) configured to enable a non-hot-swappable industry standard expansion card to function as a hot-swappable industry standard expansion card.

Referring again to FIG. 4, hot swap logic 202 may include hold-in-reset technology 204 (e.g., hardware and/or firmware) that may be configured to hold industry standard expansion card 250 in a reset state until industry standard expansion card 250 is functioning properly. Once functioning properly, hold-in-reset technology 204 may be configured to release industry standard expansion card 250 from the reset state so that industry standard expansion card 250 may enter a standard operation state.

Hot swap logic 202 may further include start-stop technology 206 (e.g., hardware and/or firmware) that may be configured to allow IT component 12 (e.g., via an administrator of IT component 12) to power up and/or power down industry standard expansion card 250.

Hot swap logic 202 may further include softstart technology 208 (e.g., hardware and/or firmware) that may be configured to limit the amount of current that industry standard expansion card 250 may draw upon being powered up so that the current draw of industry standard expansion card 250 is not enough to interfere with the operation of other components of IT component 12.

General:

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. An adapter assembly comprising:
   an adapter board;
   a first connector assembly coupled to the adapter board and configured to releasably electrically couple the adapter board to a high-availability Information Technology (IT) component; and
   a second connector assembly coupled to the adapter board and configured to releasably couple the adapter board to a non-hot-swappable expansion card;
   wherein the adapter board includes hot swap logic configured to enable the non-hot-swappable expansion card to function as a hot-swappable industry standard expansion card, the hot swap logic including:
   start-stop technology that allows the high-availability IT component to power up and power down the non-hot-swappable expansion card, and
   softstart technology that limits the amount of current that the non-hot-swappable expansion card can draw upon being powered up so that the current draw of the non-hot-swappable expansion card is not enough to interfere with the operation of other components of the high-availability IT component.

2. The adapter assembly of claim 1 wherein the high-availability IT component is a portion of a data array.

3. The adapter assembly of claim 1 wherein the non-hot-swappable expansion card is a host bus adapter card.

4. The adapter assembly of claim 1 wherein the adapter assembly is configured to be positioned within an enclosure of a hot swappable IT carrier assembly.

5. A hot swappable Information Technology (IT) carrier assembly comprising:
   an enclosure; and
   an adapter assembly configured to be positioned within an enclosure, the adapter assembly including:
   an adapter board;
   a first connector assembly coupled to the adapter board and configured to releasably electrically couple the adapter board to a high-availability IT component; and a second connector assembly coupled to the adapter board and configured to releasably couple the adapter board to a non-hot-swappable expansion card;

wherein the adapter board includes hot swap logic configured to enable the non-hot-swappable expansion card to function as a hot-swappable expansion card, wherein the hot-swap logic includes:

start-stop technology that allows the high-availability IT component to power up and power down the non-hot-swappable expansion card, softstart technology that limits the amount of current that the non-hot-swappable expansion card can draw upon being powered up so that the current draw of the non-hot-swappable expansion card is not enough to interfere with the operation of other components of the high-availability IT component.

6. The hot swappable IT carrier assembly of claim 5 wherein the non-hot-swappable expansion card is a host bus adapter card.

\* \* \* \* \*